United States Patent [19]

Dieul et al.

[11] Patent Number: 5,200,133
[45] Date of Patent: Apr. 6, 1993

[54] METHOD FOR MAKING COMPOSITE MATERIAL PARTS BY STAMPING

[75] Inventors: Jean H. Dieul, Voisins-le-Bretonneux; Jean-Claude Bonneau, Chaville, both of France

[73] Assignee: Bronzavia-Air Equipment, Asnieres, France

[21] Appl. No.: 556,379

[22] Filed: Jul. 23, 1990

Related U.S. Application Data

[63] Continuation-in-part of Ser. No. 207,053, May 13, 1988, abandoned.

[30] Foreign Application Priority Data

Apr. 10, 1987 [FR] France .................. 87 05107
Sep. 15, 1987 [WO] PCT Int'l Appl. .................. PCT/FR87/00357

[51] Int. Cl.$^5$ .................................. B29C 67/14
[52] U.S. Cl. .......................... 264/257; 264/102; 264/313; 264/319; 264/324; 264/328.7; 425/417
[58] Field of Search ............ 264/257, 258, 510, 511, 264/512, 571, 102, 324, 328.7, 313, 319; 425/388, 417

[56] References Cited

U.S. PATENT DOCUMENTS

| | | |
|---|---|---|
| 1,916,435 | 7/1933 | Ott et al. . |
| 2,115,065 | 4/1938 | Dym . |
| 2,495,640 | 1/1950 | Muskat . |
| 2,964,442 | 12/1960 | Hansen . |
| 3,045,284 | 7/1962 | Peras .................. 264/257 |
| 3,055,058 | 7/1962 | Van Hartesveldt . |
| 3,704,970 | 12/1972 | Reeves . |
| 3,943,215 | 3/1976 | Grune et al. .................. 264/46.6 |
| 4,076,780 | 2/1978 | Ditto .................. 264/40.5 |
| 4,123,494 | 10/1978 | Evrad et al. .................. 264/258 |
| 4,216,184 | 8/1980 | Thomas .................. 264/229 |
| 4,239,472 | 12/1980 | Atkinson et al. .................. 425/388 |
| 4,239,727 | 12/1980 | Myers et al. .................. 264/550 |
| 4,668,175 | 5/1987 | Martin .................. 264/550 |
| 4,717,524 | 1/1988 | Aoki .................. 264/550 |

FOREIGN PATENT DOCUMENTS

| | | |
|---|---|---|
| 1557352 | 2/1969 | France . |
| 2202774 | 5/1974 | France . |
| 2274441 | 1/1976 | France . |
| 2559099 | 8/1985 | France . |
| 2567807 | 1/1986 | France . |
| 1013012 | 12/1965 | United Kingdom . |
| 2160467 | 12/1985 | United Kingdom . |

Primary Examiner—Jay H. Woo
Assistant Examiner—Robert B. Davis
Attorney, Agent, or Firm—Oblon, Spivak, McClelland, Maier & Neustadt

[57] ABSTRACT

Shaped products are prepared by molding composite materials based on a fabric consisting of at least two superimposed single-directional layers of continuous fibers stitched together with thread, with the continuous fibers being oriented in different directions from each other. The composite fabric is stamped in a die by means of a stamp while applying at the same time a monitored tension to the fabric as the fabric is forced into the hollow of the die by a stamp. The monitored tension is modulated by interposing relaxation stages having a value slightly greater than zero. The fabric, while maintained under monitored tension, is impregnated with a quantity of resin or binder needed for the formation of the finished part. The resin-fabric between the die and stamp are compressed in order to degas the resin, while at the same time, the relative position of the stamp and the die is determined in order to stop the motion of the stamp in the die until the desired thickness of the molded part to be formed is obtained. The resin is then polymerized by heating the molding apparatus to a temperature sufficient to polymerize the resin.

11 Claims, 3 Drawing Sheets

METHOD FOR MAKING COMPOSITE MATERIAL PARTS BY STAMPING

CROSS REFERENCE TO RELATED APPLICATION

This application is a continuation-in-part of abandoned application Ser. No. 07/207,053 filed May 13, 1988.

BACKGROUND OF THE INVENTION

1. Field of the Invention

The invention relates to a method to make parts, made of continuous fiber and resin based composite materials, having stamped shapes, as well as to a device for the implementing of this method.

2. Description of the Prior Art

Increasingly today, parts are being made of composite materials based on a synthetic resin binder that takes continuous fibers. The resin is either a thermoplastic or thermo-hardening resin, for example, epoxide or polystyrilpyridine or again, polyimide, and the fibers are glass fibers, carbon fibers or else a mixture of fibers of various materials.

There are many methods currently used to make composite material parts with special embossed features.

For example, there is the known air-slip technique in which a knotted-fiber based fabric, preimpregnated with resin, is used to obtain a part with special embossments by making folds in the fabric and polymerizing the resin when the desired shape is obtained. This technique gives parts with precise mechanical characteristics, but the making of the folds during the air-slip process creates finishing problems and requires the part to be stamped or put in a high pressure autoclave, and this entails heavy investment.

Another method consists in the stamping of an oriented superimposition of single-directional layers of resin-impregnated fibers followed by a polymerizing operation. A method of this type is described, in particular, in the U.S. Pat. No. 2,115,065. This method has a certain number of disadvantages. Thus, during the stamping operation, the fibers may be shifted in a disordered way, and this will affect the rigidity of the part. Finally, the use of preimpregnated fabric causes major stresses in the fibers during the stamping process, and this may cause them to break.

An object of the invention is a method which can be used to make parts out of composite materials based on continuous fibers and a binder, said parts having stamped shapes and fibers which are not damaged during manufacture.

SUMMARY OF THE INVENTION

The invention relates to a method to make parts out of composite materials based on a fabric consisting of at least two superimposed single-directional layers of continuous fibers, unconnected with each other, one layer being pointed in a different direction from the other, and held by means of a stitched connecting thread, a method wherein the fabric is stamped in a die by means of a stamp while, at the same time, monitored tension is applied to each of the fibers at the edge of rim of the die hollow, the part is impregnated with the quantity of resin or binder needed for the cohesion of the finished part while maintaining the monitored tension on the fibers and, then, the set formed by the resin or binder and the fabric between the die and the stamp is compressed so as to degas the resin by rolling while, at the same time, checking the relative position of the stamp and the die so as to stop the motion of the stamp when the said relative position is such that the desired thickness of the part is obtained, and then the resin is polymerized by carrying the die and/or the stamp to a sufficient temperature depending on the polymerizing cycle of the resin used, and the finished part is stripped, after letting it cool down along with the die and/or the stamp.

According to a preferred embodiment, the tension applied to the fibers at the edge of rim of the die hollow rim is modulated. The term "modulation" means the application of tensions or stresses for determined periods with the interposition of relaxation stages. The tensions or stresses applied depend on the surface which remains to be stamped. The relaxation is never complete. A residual tension is always applied to the edge of the fibers. This method gives deeper stamping without breaking the fibers. It also makes it possible to stamp parts of very complex shapes.

According to one method of implementation, the motion of the stamp is stopped, after the stamping operation has begun, just before the fabric is compressed between the stamp and the die, the quantity of binder or resin needed for the cohesion of the finished part is injected into the space occupied by the fabric, the set formed by the resin and the fabric is compressed by resuming the motion of the stamp so as to degas the resin by rolling while, at the same time, checking the relative position of the die and the stamp, and then the resin is polymerized by carrying the die and/or the stamp to a sufficient temperature, and the finished part is brought out after letting it cool along with the die and/or the stamp.

According to another embodiment, in order to obtain precise compression between the edges of the stamp and the edges of the die, especially when the said edges are almost parallel to the axis of movement of the stamp, the entire volume of the stamp inside the die is increased to compress, between the stamp and the die, the set formed by the fabric and the resin or the binder while, at the same time, monitoring this increase in volume so as to stop it when the desired thickness of the part is obtained, between the end of the stamping stage and the end of the polymerizing stage.

This embodiment is therefore especially advantageous because it enables compression before polymerization at every point on the part so that the desired thickness is obtained everywhere.

According to one alternative, the quantity of resin needed is deposited at the bottom of the die before the stamp has begun the stamping operation. It is obvious that the volume of resin needed is appreciably smaller than the volume of the die and that, consequently, the stamping of the fabric is practically over when the fabric pushed by the stamp comes into contact with the resin and, hence, no strain due to impregnation by resin appears during the stamping operation.

In another alternative method, a quantity of resin smaller than the quantity needed is deposited at the bottom of the die before the stamping operation, and an additional amount of resin is injected before the fabric is compressed between the stamp and the die.

This alternative method is, therefore, a combination of the first two alternatives.

The method of the invention is, therefore, especially advantageous as it makes it possible to resolve several problems faced in prior art methods.

First of all, the use of a fabric, consisting of superimposed, single-directional layers of continuous fibers, prevents shear points from appearing, during the stamping operation, between two fibers of two different layers or even between two fibers of one and the same layer. Shear points consist, for example, of elbows that occur at the intersection points when fibers intersect one another in passing successively from one layer to the other.

Then, the holding of the fibers by a linking thread prevents the distribution of fibers from becoming disordered during the stamping process. The fact that this linking thread is stitched and not woven prevents any shearing of the fibers. Furthermore, the fact that the fabric is stamped, while keeping the fibers under a monitored tension, contributes to their proper distribution and prevents, in particular, the appearance of folds in the fabric during the stamping process. The modulation of the monitored tension gives deeper stamping by preventing the fibers from breaking.

Furthermore, the preliminary stamping of the fabric before the resin is applied also prevents excessive strains on the fibers and the occurrence of forces which would tend to break them.

Finally, when the resin is applied, the fibers are stretched against the stamp and cannot be shifted in any way. The compression which follows the application of the resin enables, firstly, a rolling of the resin which eliminates the air bubbles that might occur in the thickness of the material and, secondly, creates additional tension in the fibers which increases the cohesion of the finished part.

In one method of implementation of the method, the monitored tension on the fibers is provided by a clamping device which is tightened in such a way that the fibers are allowed to slip through without being damaged or harmed.

In one method of implementation, the resin is injected through a conduit that opens out at the bottom of the hollow in the die or at any other place if necessary. When the resin is injected, it therefore flows from the bottom of the die hollow towards the edges, impregnating the fabric as and when it moves on.

BRIEF DESCRIPTION OF THE DRAWINGS

Other features and advantages of the invention will emerge from the following description, made with reference to the appended drawings, of which:

FIG. 8 is a diagram of the stamping apparatus employed in the process which shows a means of applying a monitored tension to a fabric being stamped.

DESCRIPTION OF THE PREFERRED EMBODIMENTS

Figure 1:
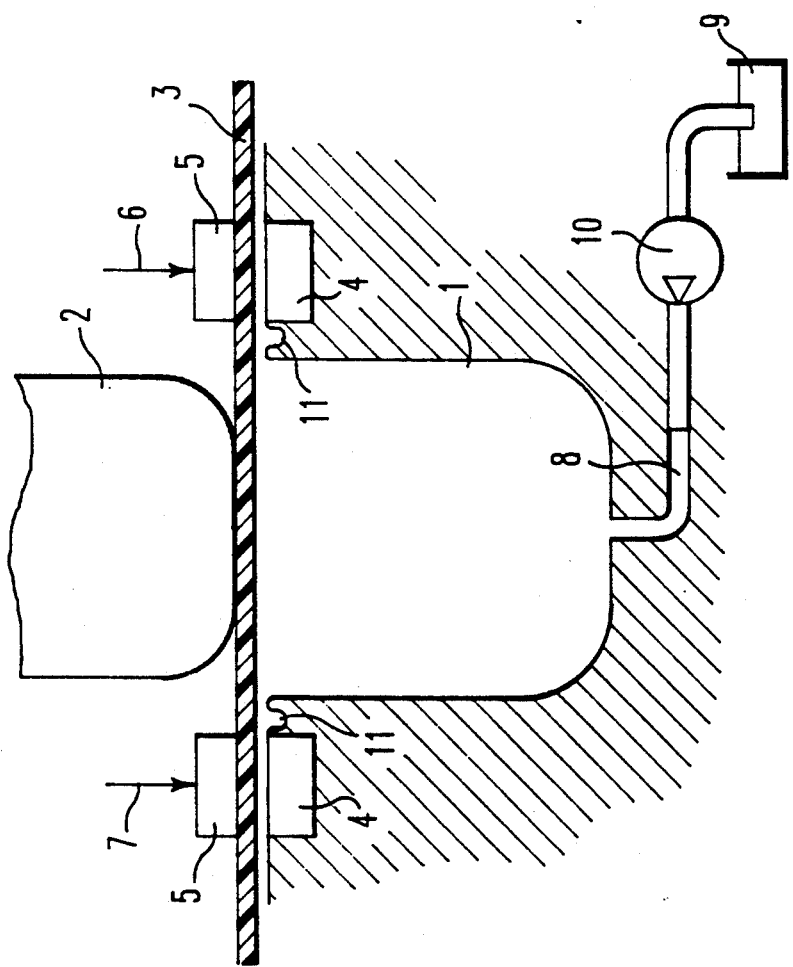
FIG. 1 is a schematic drawing of a device to implement the method of the invention.

FIG. 1 shows a schematic view of a device for stamping parts according to the invention, and the relative positions of the fabric and the device before the stamping operation.

The device has a hollow die 1 and a stamp 2 for the stamping of the fabric 3. Before being stamped, the fabric 3 is placed so that it faces the edge of the die hollow. In the example, the opening of the die 1 points upwards, and the fabric 3 is therefore placed on top of this opening.

The device also has means to clamp the fabric so that it can be made to undergo monitored tension during the stamping operation and the polymerizing of the binder. These clamping means, in the preferred embodiment shown in the figure, consist of a clamping device, 4, 5, a first jaw 4 of which surrounds, for example, the die 1 and is fixed, while the other jaw 5 which, in this case, is movable, as indicated by the arrows 6, 7, so that the fabric can be clamped against the first jaw.

The clamping force should be determined by trials, according to the thickness of the fabric and the shape of the part to be obtained.

Preferably, the clamping force is modulated. Thus, a clamping force of increasing value is applied to the clamping device, with interposed periods of relaxation during which the clamping force is slightly greater than zero. This gives deep stamping without any breakage of fibers. FIG. 8 shows a clamping apparatus by which the clamping force is alternately applied and relaxed during the stamping operation. The apparatus shows that stamp 2 contacts and exerts a force on fabric 3 thereby forcing the fabric into die hollow 1. The distributor 50 is the means by which the clamping action of the apparatus is controlled such that the clamping force is alternately applied and relaxed at clamping jaws 59, 61. The distributor controls the flow of hydraulic fluid through line 51 to the jacks 52. During the downward, force exerting movement of the stamp on the fabric, rack 53, which is fixed on the clamping plate 54, moves in contact with the distributor 50 through detector 55. Hydraulic fluid from pump 56 is allowed to flow to the jacks through lines 57 and 51 thereby applying the desired clamping force at the clamping jaws 59, 60. Force is applied until detector 55 contacts a position on rack 53 which signals the distributor to stop the pressure generated by the pump. This causes relaxation of the force exerted on the clamping jaws 59, 60. In the relaxation step, the distributor allows the fluid pressure to escape the jacks with return of flow of hydraulic fluid to the pump through line 58. As the rack continues its downward movement, compressive force is alternately applied and relaxed at the clamping jaws as the detector contacts flat portions and teeth of the rack.

At least one conduit 8 opens out into the bottom of the die 1 hollow and enables the inlet of resin or binder 9, contained in a reserve container, which can be injected through a pump 10 or other means. In an alternative embodiment, the resin can be injected through the stamp.

Again, preferably, the die has at least one expansion channel 11, the role of which shall be explained further below.

Figure 2:
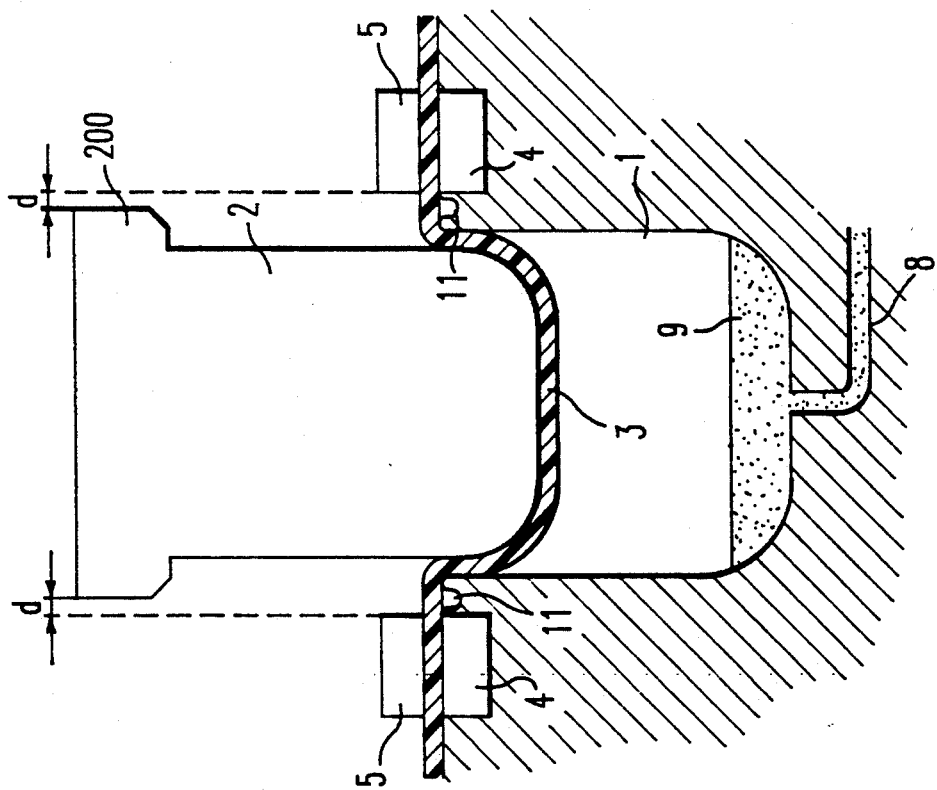

FIG. 2 shows the device when the stamping of the fabric 3 has begun.

The stamp 2 is in a descending stage and the jaws 4, 5 of the clamping device are clamped, but in such a way that they enable the fabric 3 to slip inside without being damaged and yet in such a way that they exactly fit the external shape of the stamp 1.

To enable the fabric to fit the shape of the stamp, the fibers are all unconnected with one another as explained below with reference to FIGS. 5a, 5b, 6, 7a and 7b.

This figure shows the second alternative method, namely the method according to which a certain quantity of resin or binder 9 is put at the bottom of the die 1 before the stamping is begun. This figure quite clearly shows that it is the stamped portions of the fabric 3 that come into contact with the resin 9 first, and that these are therefore parts which are in their final shape and, in fact, will undergo no further deformations during the rest of the process. Consequently, the fact that these parts come into contact with the resin before the stamp 2 has completed its travel does not adversely affect the strength of the fibers and does not give rise to any additional strains.

Subsequently, when the stamp continues its downward movement, it is clear that the resin 9 rises by capillarity, under the effect of pressure, and impregnates the fabric 3 as and when it rises.

In the first embodiment, when the stamp 2 descends to stamp the fabric, the resin 9 is not yet present but is injected when the fabric 3 is almost in contact with the bottom of the die 1 before being compressed.

The upper edges 200 of the stamp 2 are also arranged so that there remains a space or vent d between these upper edges and the movable jaw 5 when the stamp has completely finished its downward motion so that any excess binder or resin can be removed through this space.

Figure 3:
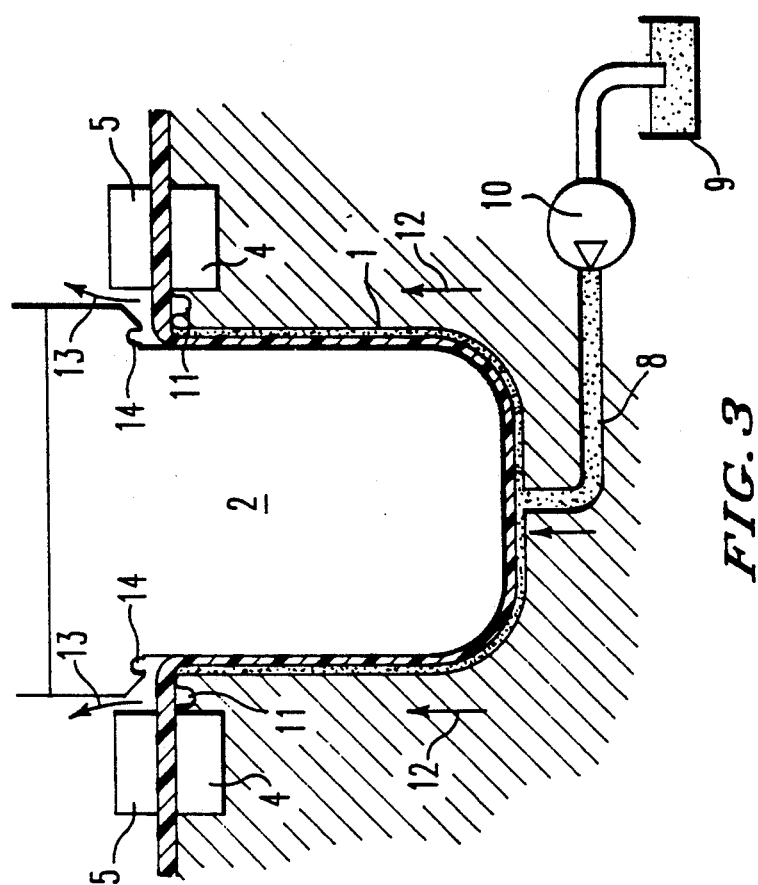
FIGS. 2 and 3 show two stages of the method implemented in the said device.

FIG. 3 shows the stage during which the resin is injected.

The stamp 2 has almost completed its travel in the die 1, but the fabric is not compressed on the edges of the die. This makes it possible to inject the resin 9, through the pump 10 and the conduit 8, between the die 1 and the stamp 2 so that it fills the meshing of the fabric 3.

In the example shown, the resin rises towards the edges of the die 1 hollow, filling the meshes of the fabric as shown by the arrows 12.

This figure also shows expansion channels 14 on the stamp 2.

These expansion channels as well as the expansion channels 11 of the die are used to ascertain that the resin or binder has actually filled those parts where it should be. For, when the resin reaches these parts, the injection pressure is stabilized or reduced and an operator, or a device associated with the injection stage, can detect this pressure stabilization or pressure reduction and then command the rest of the process.

In one embodiment (not shown), the edges of the die and/or the stamp are provided with a network of distribution grooves or holes which promote the diffusion of binder or resin on either side of the fabric during injection.

Expansion channels can also be placed at other places in the die 1 and/or the stamp 2 as well as near the edges of the die 1 hollow so that the progress of the binder or resin in the device can be monitored without affecting the stripping of the part.

The remaining part of the procedure is as follows: as soon as it is detected that a sufficient volume of resin has been injected, the operator or detecting device commands the stopping of the injection and then the compression of the set formed by the resin and the fabric so that, firstly, the whole piece is degassed so that there are no air bubbles in the finished part and, secondly, the fibers are stressed in the resin to give greater cohesion to the finished part. The excess binder or resin is removed through the vent provided for this purpose, at the top between the stamp 2 and the jaws 5 in the example shown, as indicated by the arrow 13. Finally, while maintaining the compression, the die and/or stamp are heated to polymerize the binder or resin.

In one alternative, in which a quantity of resin 9 is placed in the bottom of the die 1 before stamping, there may be two possibilities:

the quantity placed is sufficient and, in this case, the resin, when it rises, will reach the expansion channels 11, 14 of the die and/or stamp and then rise through the vent d. If this is the case, it suffices to wait for the stamp 2 and die 1 to be in the relative position corresponding to the desired thickness of the part, after compression, to perform the polymerizing operation;

the quantity of resin placed at the bottom is not enough; this becomes known when the stamp and die are simultaneously in a position such that the fabric is in contact with both of them without being compressed as yet, with no excess resin being removed through the vent d or reaching the expansion channels 11, 14.

In this latter case, an additional injection of resin is done through the conduit 8 and, before compressing in order to degas and polymerize the resin, the passage of the resin through the expansion channels 11, 14, or the leakage of excess resin through the vent is awaited.

In order to polymerize the resin/fabric set, the die and/or stamp are provided, in a preferred embodiment, with heating elements such as electrical resistors. These heating elements give a temperature which depends on the polymerization cycle of the resin used.

Once the polymerization is done, the die is allowed to cool and then the compression is relaxed and the finished part is stripped.

In an alternative method of implementation, the die and/or the stamp 2 are preheated during the injection stage in order to promote the diffusion of binder or resin and gain time in the polymerizing stage.

Figure 4:
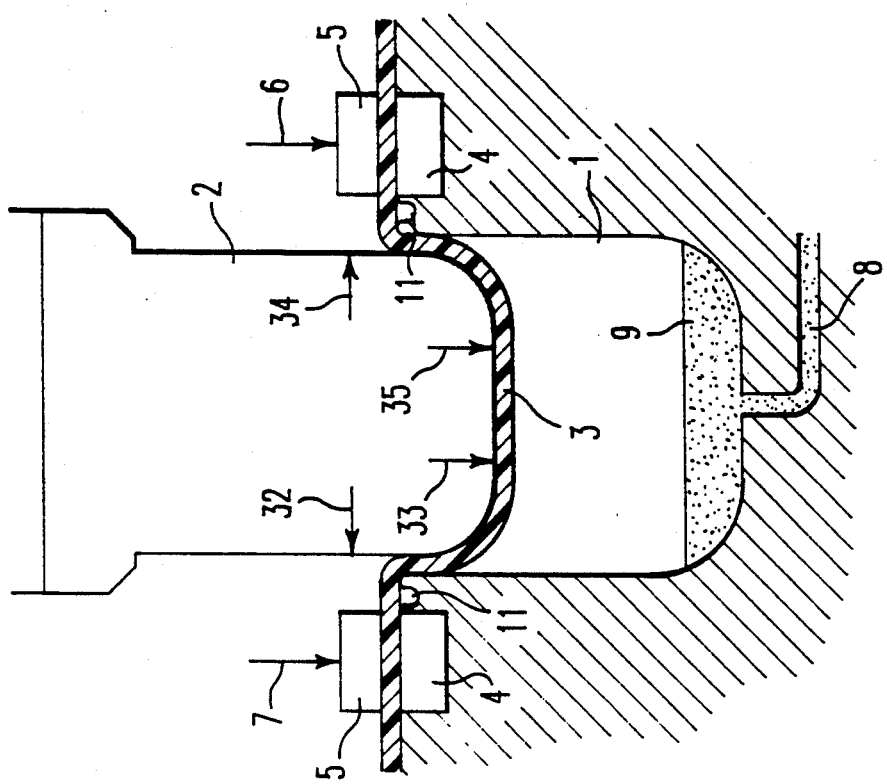
FIG. 4 is a block diagram of a second embodiment of a device implementing the method of the invention.

Like the device of FIG. 1, the device of FIG. 4 comprises a hollow die 1, a stamp 2 for the stamping of the fabric 3, means to clamp the fabric 3, such as a clamping device, enabling the application of monitored tension to the fabric during the stamping and polymerization of the binder or the resin.

At least one conduit 8 opens out in the hollow bottom of the die 1 and enables the inlet of resin or binder 9 through a pump (not shown).

Preferably, the die also has expansion channels 11 located, for example, around its opening. The channels are filled when the fabric is completely impregnated with resin or binder, so that it can be ascertained that the necessary quantity of resin is present.

According to this embodiment, the entire volume of the stamp 2 can be increased as shown by the arrows 32, 33, 34, 35 in FIG. 4. This increase in volume is set off when the fabric is entirely stamped and after the resin has been put into place.

However, this increase in volume can also take place when the resin 9 is not present at the bottom of the die 1 before stamping but is injected at the end of this stage. The resin then rises along the edges under the effect of the injection pressure produced by the pump (not shown) and impregnates the fabric.

The compression of the fabric and die after impregnation is got by increasing the volume of the stamp when the quantity of resin needed is in place. It is detected that the necessary quantity of resin is in place through the expansion channels 11.

In one embodiment of a device 12, the stamp 2 can be expanded reversibly, and the expansion is got through mechanical means such as screws, levers or jacks, or any other means known per se by which the external volume of a structure can be increased. In this case, the interior of the stamp is hollow and provided with the said means, and the exterior consists of an envelope upon which the said means act.

Thus, for example, the means may act on metallic strips which are arranged to give a general shape to the stamp and which are covered with a sock-shaped elastic envelope made of a material that withstands the polymerizing temperature. This envelope firstly prevents the strips from leaving an impression on the finished part and, secondly, prevents the resin from spreading inside the stamp.

This expandable device is especially suited to cases where the polymerization is done cold or at low temperature, i.e., for example, in cases where the polymerization is begun in the cold state with a catalyst. A polymerizing operation of this type is generally exothermic so that the stamp and die are heated during the polymerizing process.

In cases where the polymerization is done under heat, the die and/or inside of the stamp have heating elements used to bring the resin or binder to the polymerizing temperature.

In order to facilitate the stripping process, whether the polymerizing is done cold or under heat, the stamp is brought back to its original volume after polymerization.

However, this embodiment is costly and difficult to put into final shape. This is why, in a preferred embodiment of a device for the implementation of the method of the invention, when the polymerization is done under heat, the stamp 2 is made of a material with a heat expansion coefficient greater than that of the die 1, and both the die and the stamp are provided with heating elements (not shown) to preheat the resin during impregnation and to obtain the polymerizing temperature of the resin.

The heating elements are, for example, electrical resistors placed in the stamp and around the hollow of the die, in the mass.

The compression after impregnation is got, in this case, by expanding the stamp 2 in the die 1 so that these two elements approach each other relatively, thus also causing additional tension in the fibers.

The expansion starts with the preheating stage and continues during the polymerization stage, using heating elements. The expansion can be checked because the physical constants of the stamp and die are known as are the durations and temperatures of the preheating and polymerizing stages. More precisely, the constituent materials of the stamp and die are determined, as are as their dimensions when cold, by ascertaining the temperatures and the duration of the heating stages to which they will be subjected, so as to monitor the compression.

Thus, in one embodiment, the stamp is made of a light alloy, for example, based on aluminum, the expansion coefficient of which is about $23 \cdot 10^{-6}$ m/° C. and the die is of cast iron or steel, the expansion coefficient of which is about $11 \cdot 10^{-6}$ m/° C.

Hence, when the stamp has totally stamped the fabric 3 in the die 1, the heating elements of the stamp and die are put into operation so that the stamp expands inside the die, causing the fabric to be pressed dry and giving it additional compression and the polymerization process then takes place as described above.

It is desirable that the stamp and the die should be simultaneously at the same temperatures in order to prevent a temperature gradient through the fabric and resin from harming the quality of the finished part.

This method is particularly advantageous because it is inexpensive and does not require a mechanically deformable stamp. Furthermore, the expansion takes place in every direction so that there is no zone that is worked more than the others, whereas a mechanical device is imperfect and cannot be checked in every direction.

Furthermore, when the physical constants of the materials and the temperatures are known, it is easy to determine the increase in the volume of the stamp and, hence, the thickness of the part.

FIGS. 5a, 5b, 6, 7a and 7b show details of a type of preferred fabric to implement the method according to the invention.

Preferably, as these figures show, the fabric consists of four superimposed layers of single-directional fibers, unconnected with each other, and forming a run-proof structure.

Figure 5A:
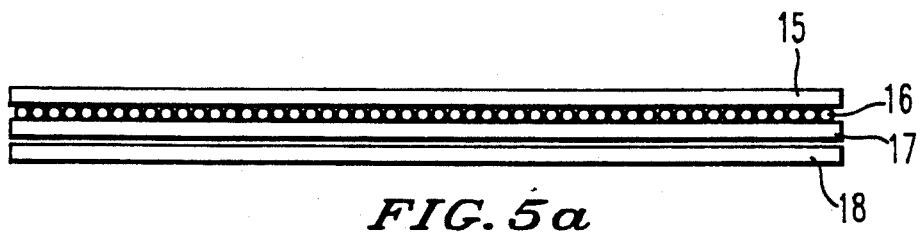
FIGS. 5a, 5b, 6, 7a and 7b are details of a preferred fabric for the implementation of the method of the invention.
Figure 5B:
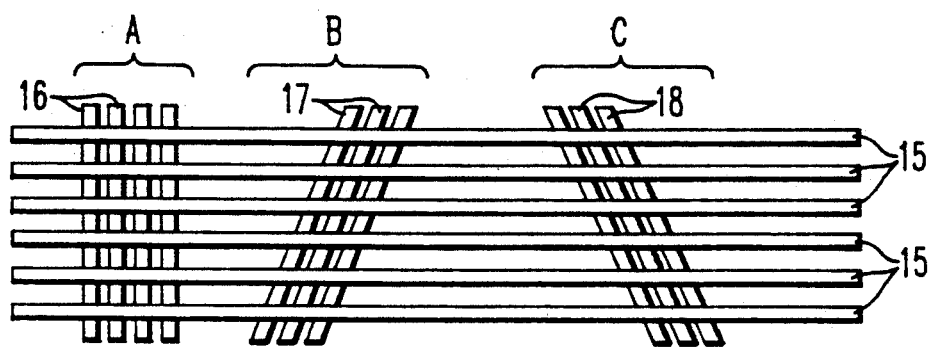
Figure 6:
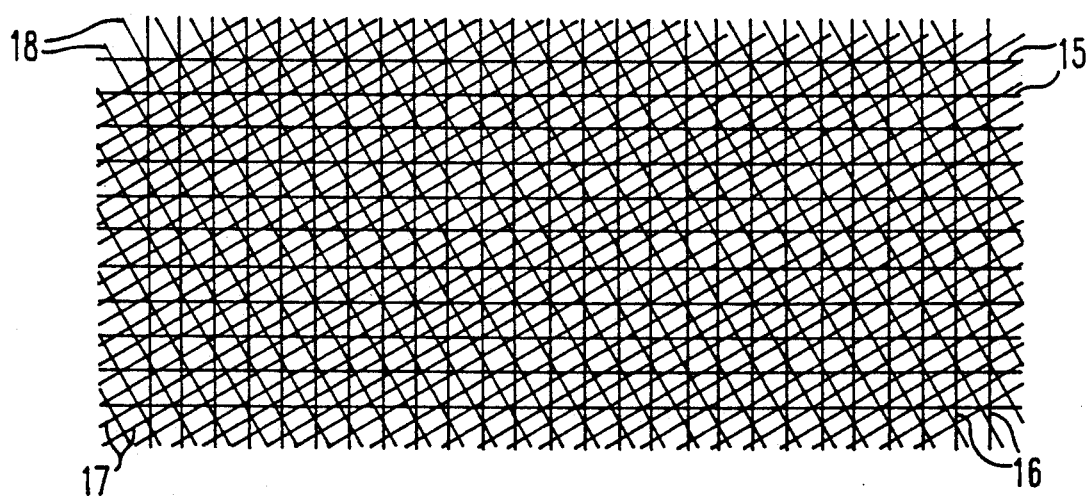

FIGS. 5a, 5b and 6 show the superimposition and relative direction of the layers with respect to one another.

FIG. 5a shows the relative position of the layers with respect to one another.

The fibers of a first layer 15 constitute a weft and are perpendicular to the fibers of a second layer 16, constituting the warp while the fibers of a third layer 17 and a fourth layer 18 form an angle with one another and with the fibers of the first and second layers, and constitute diagonals.

In one and the same layer, the fibers are assembled in packets forming threads placed parallel to one another and as close as possible to one another so that the meshes of the fabric, before stamping, are as small as possible.

FIG. 5b has three distinct parts A, B, C, which respectively show the position of the second layer 16, the third layer 17 and the fourth layer 18 with respect to the first layer 15. Actually, the four layers are superimposed.

This FIG. 5b thus shows that the first and second layers form the weft and the warp of the fabric while the third and fourth layers, 17 and 18, form two diagonals, and FIG. 5 shows the relative distribution of each layer and gives an overall picture of the finished fabric.

Depending on the use to be made, the optimum angles between the fibers of the various layers are determined in advance and the fabric is prepared accordingly.

Figure 7A:
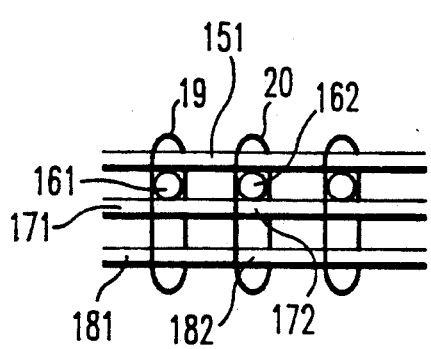
Figure 7B:
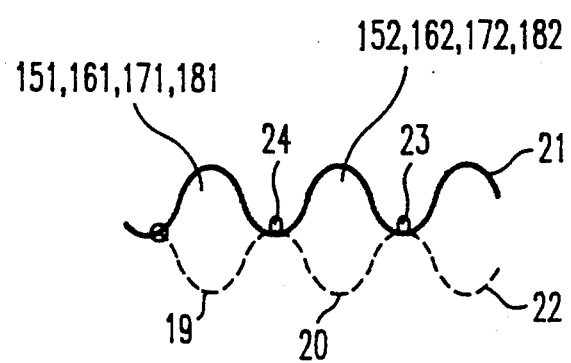

FIGS. 7a and 7b show how the cohesion of the fabric is obtained during the stamping process. At every point where four packets 151, 161, 171 and 181 of elementary fibers of one and the same layer are superimposed, they are linked together by means of a loop 19, 20, made with two threads 21, 22 intersecting each other between two series 151, 161, 171, 181 and 152, 162, 172, 182 of four packets of superimposed fibers. The linking threads are therefore stitched.

In order to perfect the cohesion and make the fabric run-proof, preferably at each intersection of the threads 21, 22, it is provided that one of the two threads will make a holding stitch 23, 24, around the other.

The invention is not related solely to the implementing methods described but, of course, to all their equivalents. The invention is applicable, for example, especially to the making of parts out of silicon carbide based fibers. It can be used, moreover (and this is an advantage), to obtain high stamping ratios, namely, a high ratio between the depth and the diameter of the stamped part, and more generally, between the depth and the basic dimensions of the stamped part.

What is claimed as new and desired to be secured by Letters Patent of the United States is:

1. A method for making molded objects out of composite materials based on a fabric consisting of at least two superimposed fiber layers held together by means of a stitched connecting thread wherein the fibers in each layer are continuous and are oriented in a single direction, the layers being positioned relative to each other so that the direction of fibers in any given layer is different from the direction of fibers in the remaining layer(s), comprising the steps of:

- stamping the fabric in a rimmed die having a hollow contour by means of a stamp which conforms in shape to the hollow of the die, while applying at the same time to the fabric which overlays the rim and hollow of the die, a monitored tension on the fabric at the rim which is modulated by interposing relaxation stages which apply a minimum tension slightly greater than zero;
- impregnating a portion of the fabric with the quantity of resin or binder needed for the cohesion of the finished object thereby forming a set, while maintaining the monitored tension on the fabric;
- compressing the set formed by the resin or binder and the fabric between the die and stamp in order to degas the resin, while, at the same time, checking the relative position of the stamp and the die in order to stop the motion of the stamp when said relative position is such that the desired thickness of the object is obtained;
- polymerizing the resin by heating the die, stamp, or both, to a temperature which enables the polymerization of the resin; and
- removing the finished object from the die after allowing the die, stamp, or both to cool.

2. The method according to claim 1, wherein the fabric is stamped in said die while exerting a modulated and monitored tension on the fabric at the edge of the rim of the die hollow, the movement of the stamp is stopped just before the fabric is compressed between the stamp and the die, and a quantity of binder or resin needed for the cohesion of the molded object is injected between the stamp and the die, in the space occupied by the fabric, the set formed by the resin and the fabric is compressed by resuming the motion of the stamp in order to degas the resin while at the same time, monitoring the relative positions of the stamp and the die, and then the resin is polymerized by heating at least the die, the stamp or both to a sufficient temperature and the finished object is removed after letting the object cool along with at least the die, the stamp or both.

3. The method according to claim 2, wherein the moment of injection is detected before compressing the resin and fabric and before polymerizing the resin.

4. The method according to claim 1, wherein a quantity of resin is placed at the bottom of the die and then the stamp by force descends into the die hollow thereby exerting a tension which is monitored on the fibers of the fabric to stamp the fabric, the descending motion of the stamp is continued when the fabric is in contact with the resin to compress the entire portion of fabric in the die so as to make the resin rise between the edges of the die and so as to degas the entire portion of the fabric in the die and wherein the polymerizing and stripping is done after positioning the die and the stamp precisely with respect to each other, so as to obtained the desired thickness of the finished portion of the fabric, after ascertaining that the quantity of resin is sufficient.

5. The method according to claim 4, wherein, in the event the quantity of resin in the die hollow is insufficient to form the product composite material, additional resin is injected before compression of the fabric which at the same time degasses the resin.

6. The method according to claim 1, wherein a stamping operation is done on a fabric consisting of four single-directional layers of continuous fibers, a first layer forming the weft of the fabric and the second layer forming the warp, and the other two layers forming two diagonals where the fibers of each layer can make any angle between each other and with the first two layers.

7. The method according to claim 6, wherein the fibers of each layer of fabric are assembled in packets and wherein each point of the surface, where four packets of fibers are superimposed, has a run-proof connecting loop.

8. The method according to claim 7, wherein a loop is made with two threads that intersect each other between two series of four packets of superimposed fibers.

9. The method according to claim 1, wherein the die, the stamp or both are preheated before the injection, the compression or injection and compression of the resin or binder.

10. The method according to claim 1, wherein the compression between the stamp and the die of the set formed by the resin or binder and the fabric is achieved by increasing the external volume of the stamp by reversible expansion which is monitored, inside the die between the end of the stamping stage and the end of the polymerizing stage.

11. The method according to claim 2, wherein the quantity of resin required for injection is detected before compressing the resin and fabric and before polymerizing the resin.

* * * * *

UNITED STATES PATENT AND TRADEMARK OFFICE
CERTIFICATE OF CORRECTION

PATENT NO. : 5,200,133
DATED      : April 6, 1993
INVENTOR(S) : Jean H. Dieul et al.

It is certified that error appears in the above-identified patent and that said Letters Patent is hereby corrected as shown below:

On the title page, Item [30],

One priority has been omitted from the Foreign Application Priority Data. It should read as follows:

```
--Sep. 17, 1986   [FR]   France..............86 13007

Apr. 10, 1987   [FR]   France..............87 05107

Sep. 15, 1987   [WO]   PCT Int'l
                         Appl. ..............PCT/FR87/00357--
```

Signed and Sealed this

Fourteenth Day of December, 1993

*Attest:*

BRUCE LEHMAN

*Attesting Officer*   *Commissioner of Patents and Trademarks*